(12) United States Patent
Guardini et al.

(10) Patent No.: US 10,944,971 B1
(45) Date of Patent: Mar. 9, 2021

(54) METHOD AND APPARATUS FOR FRAME ACCURATE FIELD OF VIEW SWITCHING FOR VIRTUAL REALITY

(71) Applicant: Cinova Media, Mountain View, CA (US)

(72) Inventors: Domenico Guardini, Mountain View, CA (US); Anurag Mendhekar, Mountain View, CA (US); Pierre Seigneurbieux, Mountain View, CA (US)

(73) Assignee: Cinova Media, Mountain View, CA (US)

( * ) Notice: Subject to any disclaimer, the term of this patent is extended or adjusted under 35 U.S.C. 154(b) by 168 days.

(21) Appl. No.: 15/982,004

(22) Filed: May 17, 2018

Related U.S. Application Data

(60) Provisional application No. 62/509,531, filed on May 22, 2017.

(51) Int. Cl.
| | | |
|---|---|---|
| *H04N 19/00* | (2014.01) | |
| *H04N 19/132* | (2014.01) | |
| *H04N 19/154* | (2014.01) | |
| *H04N 19/583* | (2014.01) | |
| *H04N 19/172* | (2014.01) | |
| *H04N 19/137* | (2014.01) | |
| *H04N 19/162* | (2014.01) | |

(52) U.S. Cl.
CPC ......... *H04N 19/132* (2014.11); *H04N 19/137* (2014.11); *H04N 19/154* (2014.11); *H04N 19/162* (2014.11); *H04N 19/172* (2014.11); *H04N 19/583* (2014.11)

(58) Field of Classification Search
CPC .. H04N 19/132; H04N 19/137; H04N 19/154; H04N 19/162; H04N 19/172
See application file for complete search history.

(56) References Cited

U.S. PATENT DOCUMENTS

| | | | |
|---|---|---|---|
| 5,596,659 A | 1/1997 | Normile et al. | |
| 5,703,799 A | 12/1997 | Ohta | |
| 5,856,832 A * | 1/1999 | Pakenham | ............... H04N 1/40 345/501 |

(Continued)

FOREIGN PATENT DOCUMENTS

| | | |
|---|---|---|
| JP | 2003-018412 | 1/2003 |
| JP | 2004-173205 | 6/2004 |

(Continued)

OTHER PUBLICATIONS

Augustine, P., et al. entitled "Anatomical Distribution of Rods and Cones"—National Institutes of health, neuroscience, 2nd edition. Sunderland (MA); Sinauer Associates, dated 2001 retrieved from the web at https://www.ncbi.nlm.nih.gov/books/NBK10848/ (2 pgs.).

(Continued)

*Primary Examiner* — Sean T Motsinger
(74) *Attorney, Agent, or Firm* — DLA Piper LLP (US)

(57) ABSTRACT

A low-complexity method and apparatus for frame accurate field of view switching for virtual reality systems may be used principally for streaming virtual reality data systems, allowing optimal and consistent quality for field of view based VR streaming engines. The method and apparatus may also be used for other virtual reality data systems.

27 Claims, 10 Drawing Sheets

(56) References Cited

U.S. PATENT DOCUMENTS

| | | | |
|---|---|---|---|
| 5,900,849 | A | 5/1999 | Gallery |
| 6,016,360 | A | 1/2000 | Nguyen et al. |
| 6,052,205 | A | 4/2000 | Matsuura |
| 6,128,407 | A | 10/2000 | Inoue et al. |
| 6,393,156 | B1 | 5/2002 | Nguyen et al. |
| 6,463,178 | B1 | 10/2002 | Kondo et al. |
| 6,466,254 | B1 | 10/2002 | Furlan et al. |
| 6,625,221 | B2 | 9/2003 | Knee et al. |
| 6,690,731 | B1 | 2/2004 | Gough et al. |
| 6,697,521 | B2 | 2/2004 | Islam et al. |
| 6,715,003 | B1 | 3/2004 | Safai |
| 6,792,153 | B1 | 9/2004 | Tsujii |
| 6,938,073 | B1 | 8/2005 | Mendhekar et al. |
| 7,003,167 | B2 | 2/2006 | Mukherjee |
| 7,149,811 | B2 | 12/2006 | Wise et al. |
| 7,791,508 | B2 | 9/2010 | Wegener |
| 7,916,960 | B2 | 3/2011 | Mizuno |
| 7,965,900 | B2 | 6/2011 | Maurer et al. |
| 8,077,990 | B2 | 12/2011 | Islam |
| 8,130,828 | B2 | 3/2012 | Hsu et al. |
| 8,265,144 | B2 | 9/2012 | Christoffersen |
| 8,422,804 | B2 | 4/2013 | Islam |
| 8,463,033 | B2 | 6/2013 | Islam |
| 8,639,057 | B1 | 1/2014 | Mendhekar et al. |
| 8,811,736 | B2 | 8/2014 | Islam |
| 9,042,644 | B2 | 5/2015 | Mendhekar et al. |
| 9,230,341 | B2 | 1/2016 | Islam |
| 2001/0031009 | A1 | 10/2001 | Knee et al. |
| 2001/0041011 | A1 | 11/2001 | Passagio et al. |
| 2001/0048770 | A1 | 12/2001 | Maeda |
| 2002/0108118 | A1 | 8/2002 | Cohen et al. |
| 2003/0002734 | A1 | 1/2003 | Islam et al. |
| 2003/0202579 | A1 | 10/2003 | Lin et al. |
| 2003/0202581 | A1 | 10/2003 | Kodama |
| 2003/0206590 | A1 | 11/2003 | Krishnamachari |
| 2004/0137886 | A1 | 7/2004 | Ross et al. |
| 2004/0264793 | A1 | 12/2004 | Okubo |
| 2005/0063599 | A1 | 3/2005 | Sato |
| 2006/0039473 | A1 | 2/2006 | Filippini et al. |
| 2006/0115166 | A1 | 6/2006 | Sung et al. |
| 2006/0285587 | A1 | 12/2006 | Luo et al. |
| 2007/0019875 | A1 | 1/2007 | Sung et al. |
| 2007/0064800 | A1* | 3/2007 | Ha .................. H04N 19/597 375/240.12 |
| 2007/0206871 | A1 | 9/2007 | Jalil et al. |
| 2007/0237237 | A1 | 10/2007 | Chang et al. |
| 2007/0248163 | A1 | 10/2007 | Zuo et al. |
| 2008/0247658 | A1 | 10/2008 | Lee et al. |
| 2010/0020868 | A1 | 1/2010 | Ayres, Jr. et al. |
| 2010/0066912 | A1 | 3/2010 | Kumwilaisak et al. |
| 2010/0110163 | A1* | 5/2010 | Bruls .................. H04N 19/30 348/43 |
| 2010/0266008 | A1 | 10/2010 | Reznik |
| 2010/0272174 | A1* | 10/2010 | Toma .................. H04N 19/426 19/426 |
| 2010/0329358 | A1 | 12/2010 | Zhang et al. |
| 2011/0103445 | A1 | 5/2011 | Jax et al. |
| 2011/0200262 | A1 | 8/2011 | Canel-Katz et al. |
| 2011/0206287 | A1 | 8/2011 | Islam |
| 2011/0307685 | A1 | 12/2011 | Song |
| 2012/0026157 | A1* | 2/2012 | Unkel .................. H04N 13/351 345/419 |
| 2013/0024898 | A1* | 1/2013 | Munetsugu ............ H04N 7/181 725/61 |
| 2013/0072299 | A1 | 3/2013 | Lee |
| 2013/0286160 | A1* | 10/2013 | Sasaki .................. H04N 21/816 348/43 |
| 2013/0315573 | A1* | 11/2013 | Sasaki .................. H04N 19/597 386/356 |
| 2014/0133583 | A1 | 5/2014 | Lin et al. |
| 2014/0188451 | A1 | 7/2014 | Asahara et al. |
| 2015/0055937 | A1 | 2/2015 | Van Hoff et al. |
| 2015/0279022 | A1* | 10/2015 | Shuster ................ H04N 13/332 345/427 |
| 2015/0338204 | A1* | 11/2015 | Richert .................. G06T 7/593 348/135 |
| 2016/0073114 | A1 | 3/2016 | Kawamura et al. |
| 2017/0188007 | A1* | 6/2017 | Bae ...................... H04N 13/194 |
| 2018/0077209 | A1* | 3/2018 | So .......................... H04L 65/607 |
| 2018/0232955 | A1* | 8/2018 | Namgoong .......... H04N 13/344 13/344 |
| 2018/0270471 | A1* | 9/2018 | Luo ........................ H04N 19/597 |
| 2019/0174125 | A1* | 6/2019 | Ninan .................. H04N 13/383 |
| 2019/0200084 | A1* | 6/2019 | Gilson ........... H04N 21/234327 |
| 2019/0310472 | A1* | 10/2019 | Schilt .................. H04N 19/597 |
| 2019/0362151 | A1* | 11/2019 | Stokking ............ H04N 21/6587 |
| 2019/0364204 | A1* | 11/2019 | Wozniak ............. H04N 21/816 |
| 2019/0364205 | A1* | 11/2019 | Wozniak ............. G06K 9/00711 |

FOREIGN PATENT DOCUMENTS

| | | |
|---|---|---|
| JP | 2007-104645 | 4/2007 |
| JP | 2007-318711 | 12/2007 |
| KR | 2003-0007080 | 1/2003 |
| KR | 2010-0918377 | 9/2009 |
| WO | WO 2003/103295 | 12/2003 |
| WO | WO 2006/061734 | 6/2006 |

OTHER PUBLICATIONS

Anonymous, entitled "Roads & Cones"—retreated from the web on May 7, 2018 at https://www.cis.rit.edu/people/faculty/montag/vandplite/pages/chap_9/ch9p1.html_(8 pgs.).

* cited by examiner

METHOD AND APPARATUS FOR FRAME ACCURATE FIELD OF VIEW SWITCHING FOR VIRTUAL REALITY

PRIORITY CLAIMS/RELATED APPLICATIONS

This applications claims the benefit under 35 USC 119(e) to U.S. Provisional Patent Application No. 62/509,531, file May 22, 2017 and entitled "Method And Apparatus For Frame Accurate Field Of View Switching For Virtual Reality", the entirety of which is incorporated herein by reference.

FIELD

The field relates generally to video processing and in particular virtual reality video processing in the context of fast switching between video streams.

BACKGROUND

In the domain of virtual reality video streaming, technologies exist that take advantage of Field Of View streaming in order to reduce bitrates to acceptable ranges, as opposed to sending the full 360 degrees view at all time. In these adaptive virtual reality streaming systems built on top of HTTP download infrastructures (HLS, Smooth Streaming, DASH), the players download chunks of data mapping to the current FOV being looked at by the users. However, using a legacy adaptive streaming architecture is not well suited for low latency applications like VR as it comes with the drawback of inducing long delays as the player downloads chunks of video and as a result, FOV can only be switched at chunk boundaries when the user is moving his view point. As a result, the user will experience a disruption of the immersive experience through a reduction in video quality or viewing of the wrong FOV while waiting for the next chunk to be ready for viewing.

Video codecs like MPEG-2, H264 or H265 take advantage of spatial and temporal redundancies of the video content to compress the original content through the creation of Group Of Pictures (GOP), including independent frames or key frames (I-Frame) that are used as the foundation to encode predictive frames (P-Frames.) Because of the nature of the encoding, switching from one video sequence to another can only be done in a seamless way at key frame boundaries with these known video codecs. In regular video distribution, this is not an issue, as it is often fine to wait for the nearest end of the GOP before a switch can be made between the current program and the next one.

However, for virtual reality, when dealing with FOV encoding, it becomes very important to be able to switch fast and on a frame by frame basis. Without a fast switching capability, the consumer is experiencing degradation in quality while waiting for the optimal FOV to be switched. The end result, in current systems, is a constant variation of quality when the user's virtual reality headset moves around that is not acceptable and is a significant technical problem with existing field of view switching systems.

Thus, it is desirable to provide method and apparatus for frame accurate field of view switching for virtual reality that overcome the above limitations and problems of conventional systems and it is to this end that the disclosure is directed.

DETAILED DESCRIPTION OF ONE OR MORE EMBODIMENTS

The disclosure is particularly applicable to a streaming virtual reality system that has a client/server type architecture and it is in this context that the disclosure will be described. It will be appreciated, however, that the system and method for fast FOV switching has greater utility since it may be used with other streaming virtual reality systems that may utilize a different architecture (peer to peer, single computer, mainframe computer, etc.) and also may be used with other systems in which it is desirable to be able to switch on a frame by frame based between video streams.

The method and apparatus for frame accurate field of view switching for virtual reality disclosed below may be optimally used for a field of view (FOV) streaming architecture in which only a small amount of the original virtual reality data is sent to each virtual reality device/player, based on the user's headset position. To implement such an architecture at scale, the system and method may pre-generate the virtual reality content and store the virtual reality content, to allow streaming servers to replay the content at any time without having to re-encode the content every time a user is in need of accessing some portion of the particular virtual reality data (known as an asset.)

Figure 1:
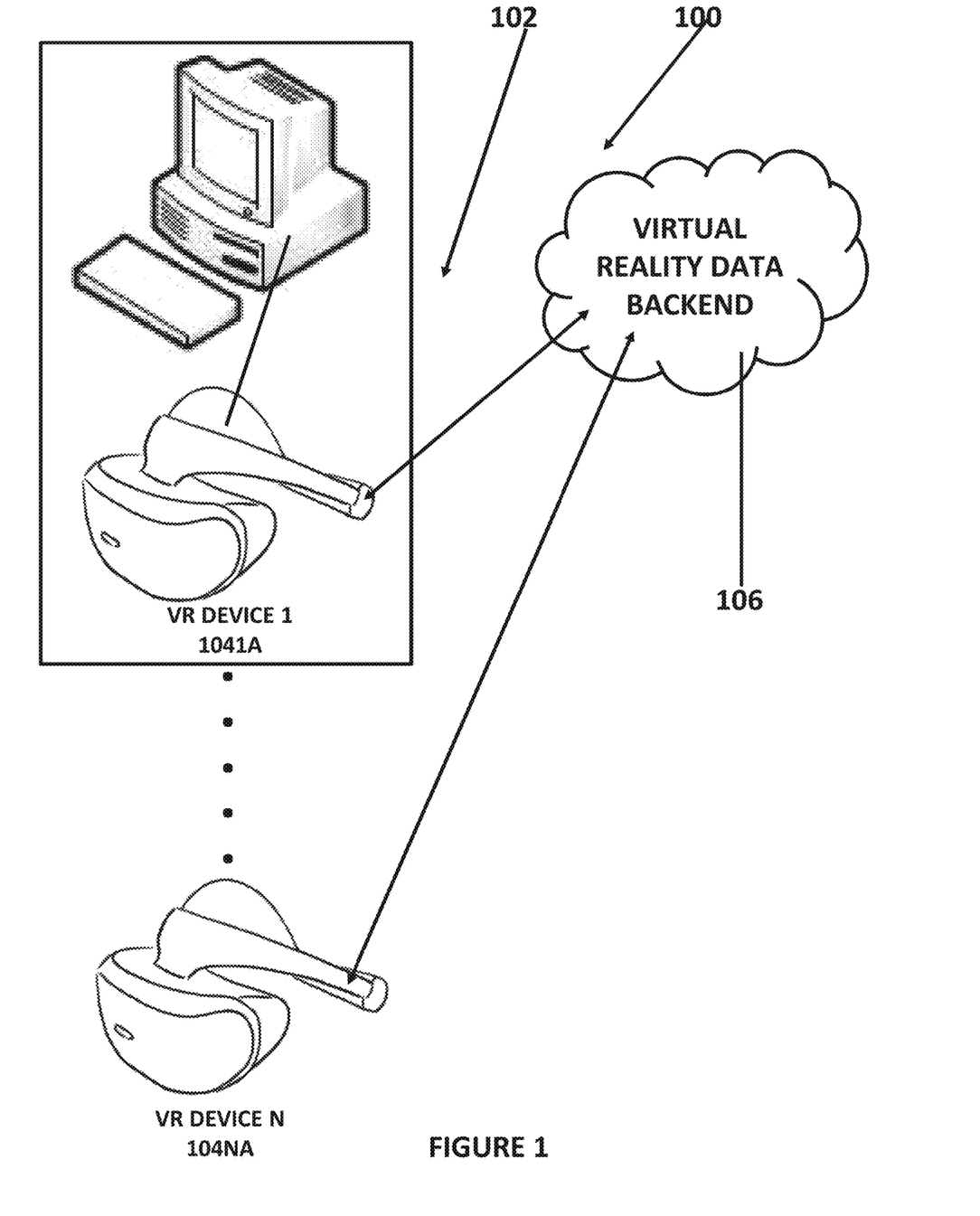
FIG. 1 illustrates an example of a streaming virtual reality system that may incorporate a method and apparatus for frame accurate field of view switching for virtual reality.

FIG. 1 illustrates a streaming virtual reality system 100 having a plurality of virtual reality devices 102 and a virtual reality data backend 106 that are coupled together by a communication path that the system 100 may utilize for the method and apparatus of frame accurate field of view switching for virtual reality. The communication path between each virtual reality device 102 and the backend 106 may be a wired or wireless network, a cellular data network, a wireless computer data network, an Ethernet or optical data connection and the like. The communications path between each virtual reality device 102 and the backend 106 may be different (or have different components) and thus the communications path between each virtual reality device 102 and the backend 106 may each have different network latency.

In a streaming system as shown in FIG. 1, the backend 106 may receive data from each virtual reality device (including positioning/orientation data for the virtual reality device and/or network congestion data) and may perform frame accurate field of view switching for virtual reality. It is noted that the frame accurate field of view switching for virtual reality disclosed below also may be implemented in other virtual reality systems (that for example may not stream the virtual reality data but graphic rendering commands for example) and the streaming virtual reality system shown in FIG. 1 is just illustrative since the system and method may be used with any system in which it would be desirable to provide frame accurate field of view switching for virtual reality.

Each virtual reality device 102 may be a device that is capable of receiving virtual reality streaming data, processing the virtual reality streaming data (including possibly decompressing that data and partial FOV switching in some implementations as described below) and displaying the virtual reality streaming data to a user using some type of virtual reality viewing device. Each virtual reality device may further directly deliver an immersive visual experience to the eyes of the user based on positional sensors of the virtual reality device that detects the position of the virtual reality device and affects the virtual reality data being displayed to the user. Each virtual reality device 102 may include at least a processor, memory, one or more sensors for detecting and generating data about a current position/orientation of the virtual reality device 102, such as an accelerometer, etc., and a display for displaying the virtual reality streaming data. For example, each virtual reality device 102 may be a virtual reality headset, a computer having an attached virtual reality headset, a mobile phone with virtual reality viewing accessory or any other plain display device capable of displaying video or images. For example, each virtual reality device 102 may be a computing device, such as a smartphone, personal computer, laptop computer, tablet computer, etc. that has an attached virtual reality headset 104A1, or may be a self-contained virtual reality headset 104AN. Each virtual reality device 102 may have a player (that may be an application with a plurality of lines of computer code/instructions executed by a processor of the virtual reality device) that may process the virtual reality data and play the virtual reality data.

The system 100 may further comprise the backend 106 that may be implemented using computing resources, such as a server computer, a computer system, a processor, memory, a blade server, a database server, an application server and/or various cloud computing resources. The backend 106 may be implemented using a plurality of lines of computer code/instructions that may be stored in a memory of the computing resource and executed by a processor of the computing resource so that the computer system with the processor and memory is configured to perform the functions and operations of the system as described below. The backend 106 may also be implemented as a piece of hardware that has processing capabilities within the piece of hardware that perform the backend virtual reality data functions and operations described below. Generally, the backend 106 may receive a request for streamed virtual reality data for a virtual reality device (that may contain data about the virtual reality device) and perform the technical task of virtual reality data preparation (using one or more rules or lines of instructions/computer code). The VR data preparation may include generating the stream of known in view and out of view virtual reality data as well as the one or more pieces of optimized virtual reality data such as the plurality of FOVs for each frame as described below, the streams for each FOV and the zig-zag encoded streams for the fast FOV switching (collectively the "optimized streamed virtual reality data" that includes improved content quality) based on each request for streamed virtual reality data for each virtual reality device 102. The backend 106 may then stream that optimized streamed virtual reality data to each virtual reality device 102 that requested the virtual reality data. The optimized streamed virtual reality data is used to solve the technical problems of poor and noticeable VR data quality in VR systems as described above.

Figure 2:
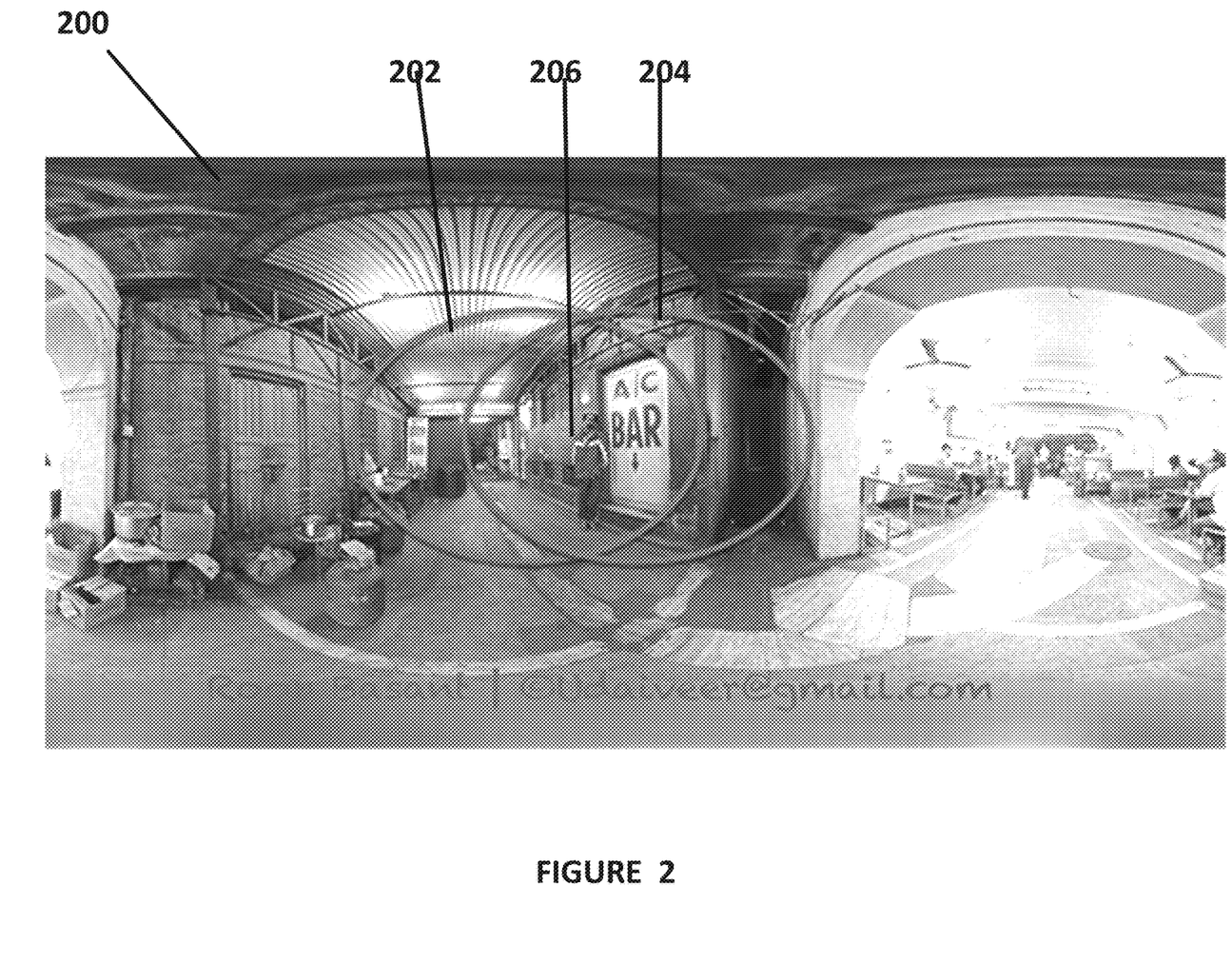
FIG. 2 illustrates an example of virtual reality data and a field of view.

FIG. 2 illustrates an example of a frame of virtual reality data 200, a view of each eye of the virtual reality device 202, 204 and a viewpoint 206 (also known as an "in-view portion" or "field of view"). In a typical virtual reality streaming system, the virtual reality data may be a plurality of frames of virtual reality data that may be compressed using various compression processes such as MPEG or H.264 or H.265. For purposes of illustration, only a single frame is shown in FIG. 2, although it is understood that the processes described below may be performed on each frame of virtual reality streaming data. In a virtual reality streaming data system, a viewer/user typically views this frame of virtual data (that is part of the virtual reality data video or virtual reality streamed data collectively the "asset")) using the virtual reality device 102 that plays back only a section of the whole frame/video based on the direction in which the virtual reality device 102 is positioned by the user who is wearing the device that may be determined by the sensors/elements of the device 102. As shown in FIG. 2, based on the direction/position of the virtual reality device, a certain portion of the frame, such as a left eye view portion 202 and a right eye portion 204 may be within the view of the user of the virtual reality device 102. For example, the virtual reality device may provide a viewport that has the left eye view portion 202, the right eye view portion 204 as shown by the overlapping ovals shown in FIG. 2 and a central region 206 (the field of view) that is displayed to both eyes of the user similar to how a human being's eyes operate so that the virtual reality system provides an immersive experience for the user. Depending upon the configuration of the virtual reality device, the field of view of the virtual reality device determines the specific portion of the frame that needs to be displayed to each eye of the user. As an example, a virtual reality device with a 90-degree horizontal and vertical field of view, will only display about $\frac{1}{4}^{th}$ of the frame in the horizontal direction and ½ of the frame in the vertical direction.

Figure 3:
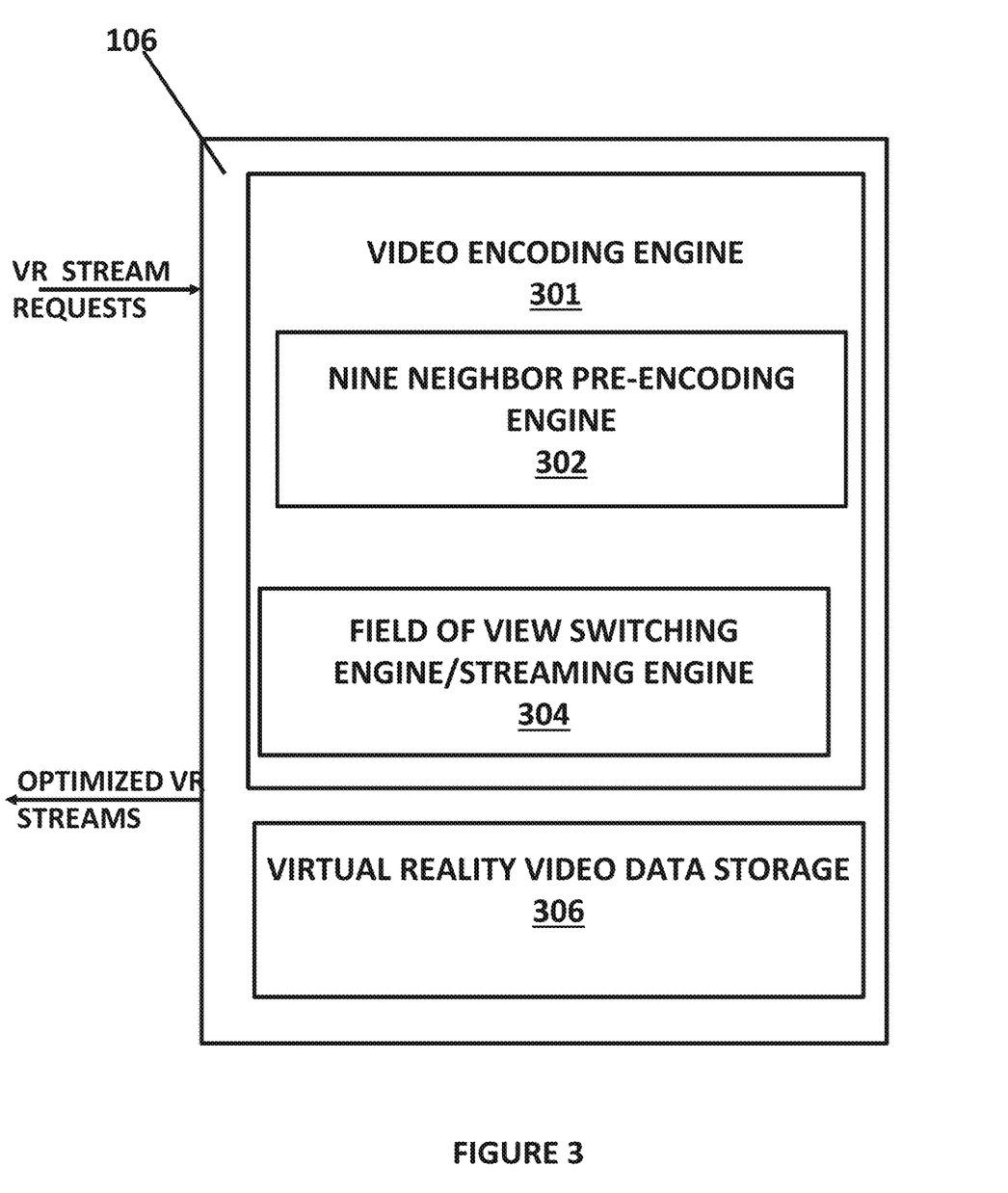
FIG. 3 illustrates more details of the virtual reality data backend that is part of the system in FIG. 1.

FIG. 3 illustrates more details of the virtual reality data backend 106 that is part of the system 100 in FIG. 1. The virtual reality data backend 106 may be used for streaming virtual reality data systems or other virtual reality data systems. In the streaming virtual reality data implementation example shown in FIG. 3, the virtual reality data backend 106 may receive virtual reality data stream requests from the one or more virtual reality devices 102 (shown in FIG. 1) and may generate an optimized virtual reality data stream for each virtual reality data stream request. The optimized virtual reality data may include the plurality of FOVs for each frame as described below, the streams for each FOV and the zig-zag encoded streams for the fast FOV switching. Each virtual reality data stream request from each particular virtual reality data device may include the request data as well as data about the particular virtual reality device including viewing data and data about a current viewing direction (based on sensor data in each virtual reality data) of the particular virtual reality data device.

The virtual reality data backend 106 may include a video encoding engine 301 that may receive each virtual data request, encode the virtual reality data for each particular virtual reality device as described below and generate the optimized virtual reality data streams for each virtual reality device. The video encoding engine 301 may be implemented using a specialized video encoding piece of hardware that performs the specific video encoding processes described below. Alternatively, the video encoding engine 301 may be implemented in software as a plurality of lines of computer code/instructions that may be executed by a processor on a computer system hosting the video encoding engine so that the processor is configured to perform the encoding processes described below. As yet another alternative, the video encoding engine 301 may be a hardware element, such as a micro-controller, microprocessor, ASIC, state machine, etc. that is programmed to perform the encoding processes. The virtual reality data backend 106 may further include a virtual reality data storage element 306 that may store data about each virtual reality device and the virtual reality data to be encoded for each virtual reality device. In some embodiments, the storage 306 may also store previously encoded optimized virtual reality data that may be communicated to a particular virtual reality device instead of having to perform the encoding if, for example, the particular virtual reality device is viewing the same scene as was previously viewed by another virtual reality device. The storage 306 may be implemented in hardware or software.

The video encoding engine 301 may further include a nine neighbor pre-encoding engine 302 and a field of view switching engine 304 and each of these engines may be implemented using a specialized device, in software or in hardware similar to the virtual reality data backend 106 as described above. The nine neighbor pre-encoding engine 302 may perform a nine neighbor pre-encoding algorithm as described below and the field of view switching engine 304 may perform a field of view switching algorithm as described below. The two engines shown in FIG. 3 allows for fast switching between field of views (FOVs) on a frame by frame basis where a player in a virtual reality device can request/receive FOVs from storage through a streaming server, and allow frame-based FOV switching. The process may use a 9 neighbor encoding architecture (implemented by the nine neighbor pre-encoding engine 302) where content is pre-encoded to account for 9 possible alternative FOVs for each frame with the process to stay on current FOV or move to a neighbor FOV on the next frame. Pre-encoding the content in such a manner allows frame by frame switching (using the field of view switching engine 304) without impacting the original quality of the stream since each frame of each virtual reality asset has the plurality of FOVs (and the other streams described above) available.

Figure 4:
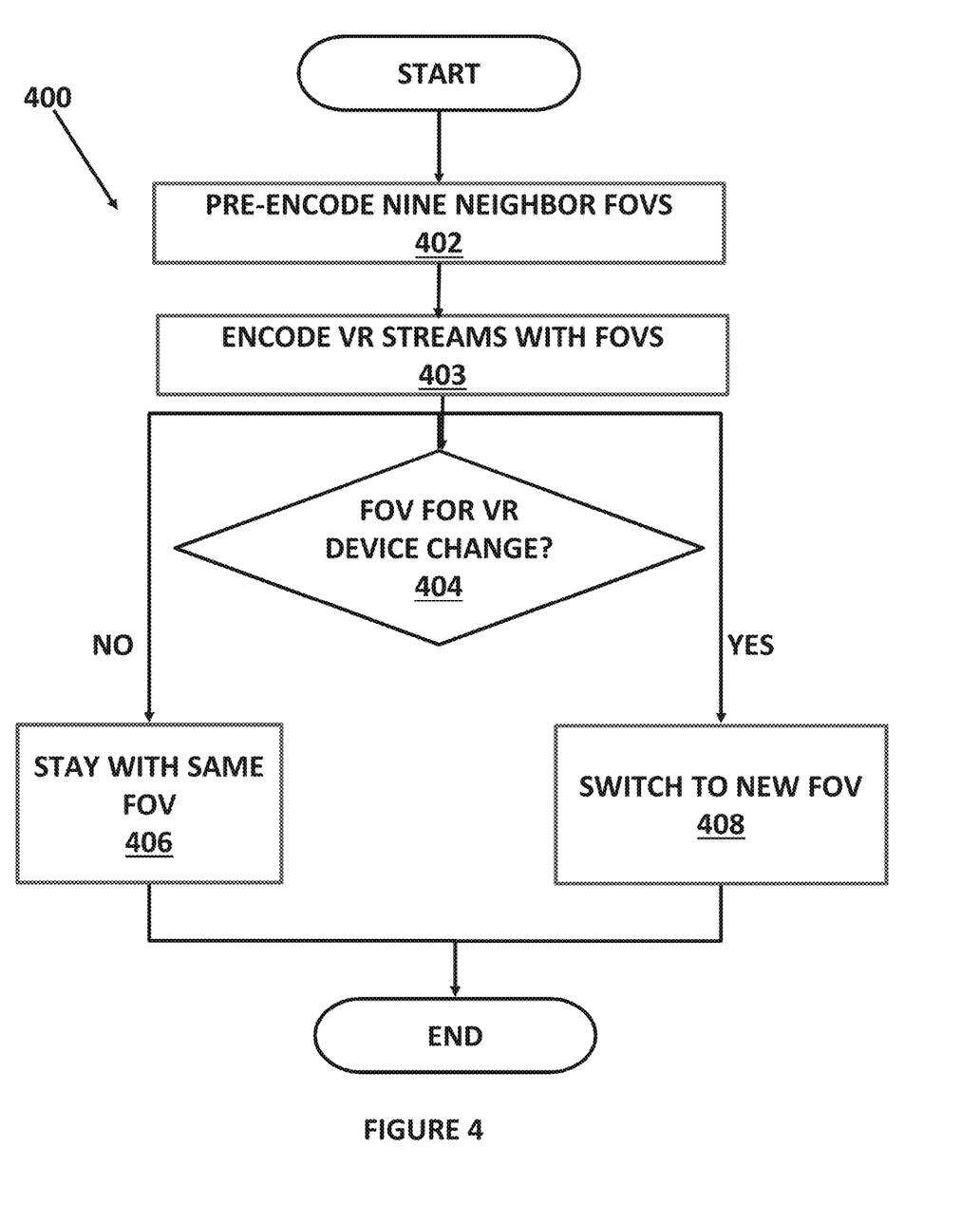
FIG. 4 illustrates a method for field of view switching.

FIG. 4 illustrates a method 400 for field of view switching for virtual reality data that may be performed on a frame by frame basis. In one embodiment, the method 400 may be used for virtual reality streaming systems. The method may also be used for other virtual reality systems. The method may be implemented, for example, by the engines 302, 304 shown in FIG. 4. For virtual reality, when dealing with field of view (FOV) encoding, it becomes very important to be able to switch at any time, and on a frame by frame basis. Without a fast switching capability, the consumer is experiencing a degradation of the quality while waiting for the optimal FOV to be switched in. The end result of a system that does not have fast switching is a constant variation of quality when the user's virtual reality head mounted device (HMD) moves around which is a technical problem of virtual reality systems. The method 400 described below overcomes this technical problem and provides a technical solution to solve the degradation in quality that occurs with typical virtual reality systems.

Figure 5:
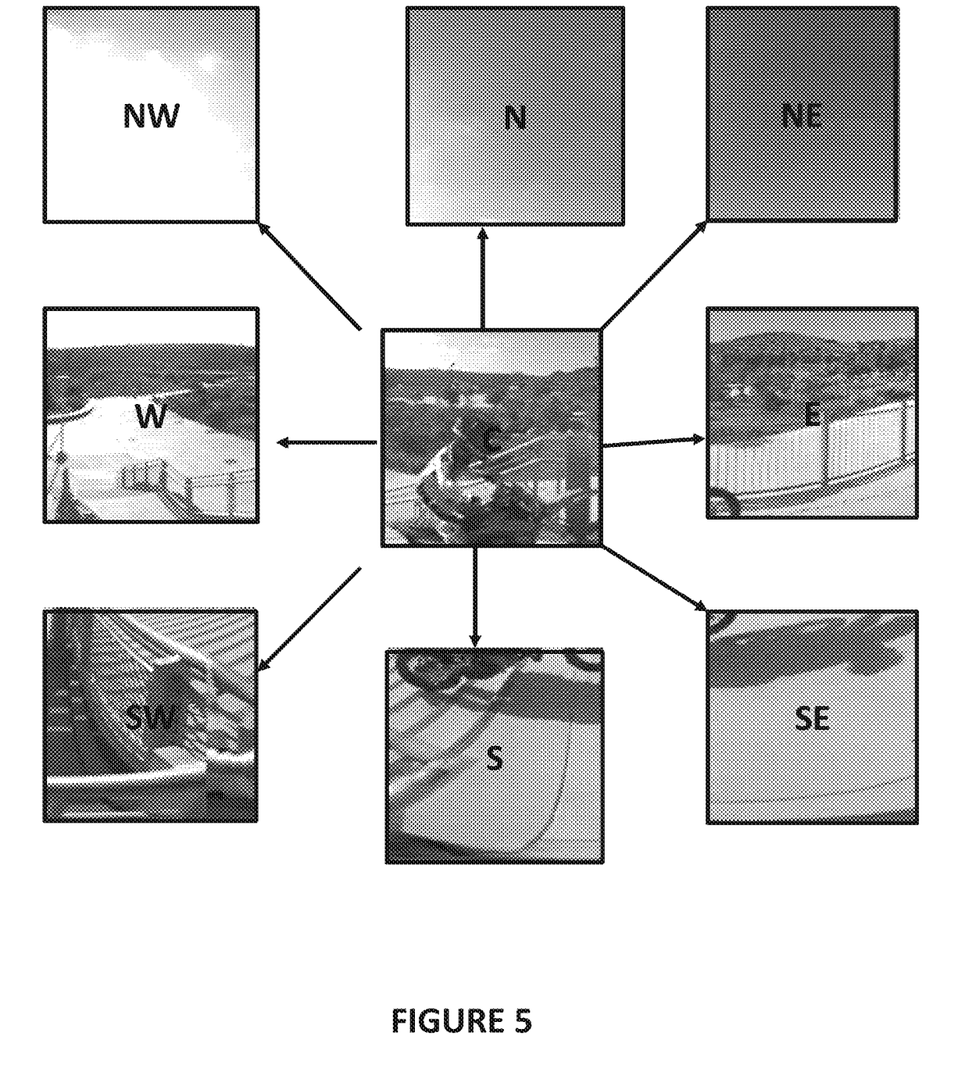
FIG. 5 illustrates an example of the nine neighbors encoding.

In the method, the virtual reality data may be pre-encoded using a nine neighbor process (402). In the nine neighbor process, the virtual reality data may be pre-encoded into multiple fields of view (FOVs) for each chunk of data in the virtual reality data asset to prepare for potential head movements of each user of each virtual reality device (based on movement data for each virtual reality device that may be communicated with the virtual reality data request). FIG. 5 illustrates an example of the nine neighbors encoding in which a current field of view may be labeled "C" for center. In a next frame, due to movement of the virtual reality device by the user, can only transition to one of the nearest FOVs (N, NE, E, SE, S, SW, W, NW) or stay at C (no change of FOV). In case of fast movements, on a frame by frame basis, the FOV switching process may still go from one neighbor to the next one. Therefore, any movement of the virtual reality headset by a user, frame by frame, can be handled using the nine neighbor process shown in FIG. 4. Thus, the method may pre-encode, for each frame of each virtual reality data asset, each of the other FOVs shown in FIG. 4 since "C" is the current FOV for the current viewpoint of the virtual reality data device. Each FOV may be generated in a well-known manner from the virtual reality data. In one embodiment, each of these FOVs may be determined and then stored in the storage 306 shown in FIG. 3. An example of the FOCs for a particular stream are shown in FIG. 5 in which the particular FOVs were generated from the scene/frame example shown in FIG. 8.

In order to be able to switch from one FOV to another one, the method pre-encodes the content in such a way that it can handle a switch at any place in the stream. The method encodes/generates one or more streams of virtual reality data with the different field of views (403) to facilitate the switching. Because of the nature of the encoding and the fact that the P Frames are predicted from a previous P frame or an I frame, going from one FOV to another means that frames belonging to the previous, current and next FOVs need to be encoded in one stream. While the flowchart in FIG. 4 shows a process in which the FOVs are generated and the stream are encoded (402, 403) that precedes the FOV switching in real time, the method may also perform the processes 403, 403 at some prior time (including determining the chunks of data for each piece of virtual reality data) and then store the FOVs, streams and the chunks of virtual reality data in the storage 306 and then perform the FOV switching process in real time as each user is viewing each particular piece of virtual reality data and moving the headset.

Figure 6:
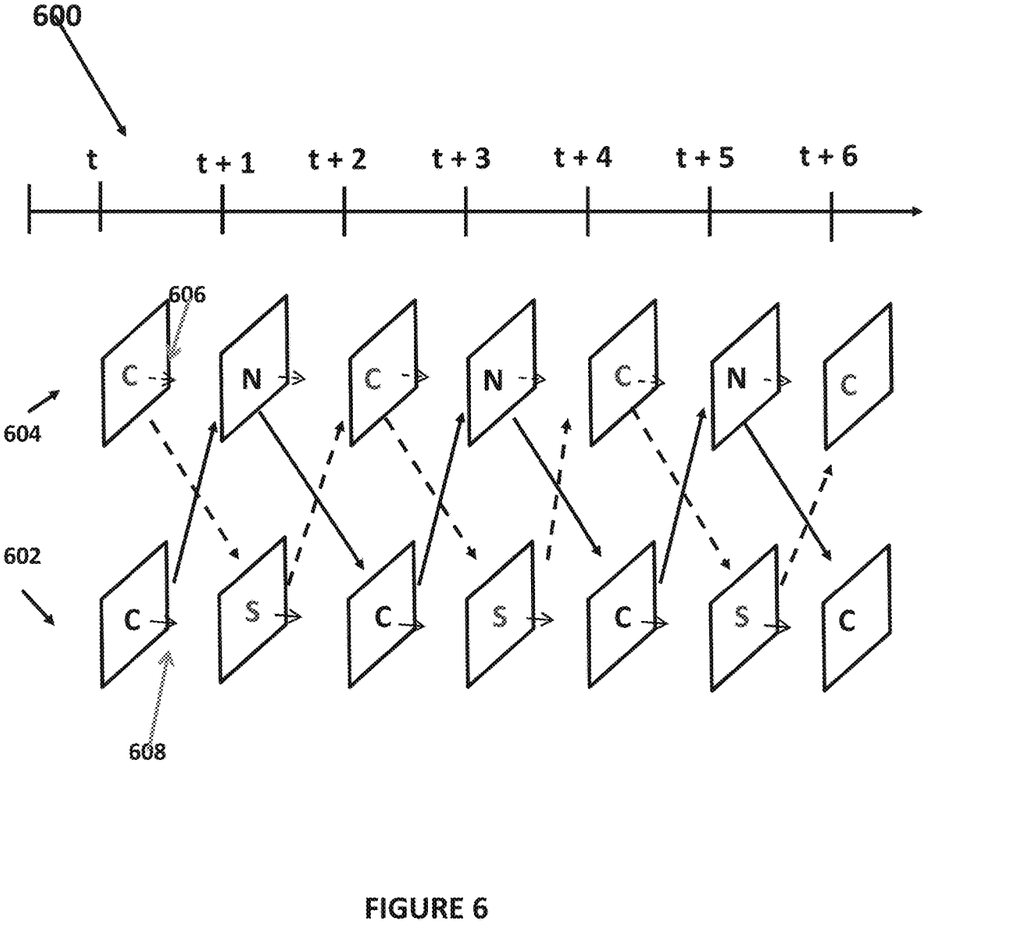
FIG. 6 illustrates an example of a stream encoding scheme between 2 neighbors.

FIG. 6 illustrates an example of a stream encoding scheme 600 for two neighbors (C and N and C and S in the example in FIG. 6) that incorporate the multiple neighbor FOVs. In order to insure seamless switching of the FOVs, a zig-zag encoding may be performed between two adjacent FOVs in the neighborhood through the length of the virtual reality data asset, such as a movie asset. In this method, the various FOV neighbors as shown in FIG. 5 have already been generated. As shown, the encoding of the stream may include a first zig-zag encoding 602 that may be performed between, for example, the frames of the FOV for the center (the current view of a particular virtual reality device) and its North neighbor FOV and a second zig-zag encoding 604 that may be performed between, for example, the frames of the FOV for the center (the current view of a particular virtual reality device) and its South neighbor FOV frame over the time of a piece of virtual reality data (t, t+1, ..., T+6, etc.) Having two cross zig-zags for 2 adjacent FOVs allows for switching in both directions at any frame of the virtual reality data. A similar zig-zag encoded stream may be generated for each pair of neighbor FOVs so that a total of sixteen zig-zag encoded streams may be generated when the nine neighbor approach is used.

In addition to the zig-zag encoding stream, the method may also generate one or more straight path encoding streams 606, 608 that may be used when the user is not changing his/her field of view. In the example in FIG. 6, the straight path encodings may include an encoding of C-N-C-N-C-N and of C-S-C-S-C-S.

The encoding shown in FIG. 6 may be per virtual reality asset, as even though the different virtual reality devices 104 might have different resolutions, the player in each virtual reality device 104 may still performs upscaling/down-scaling to map the FOVs to the display. The method may still encode multiple times to map to very different virtual reality headset 104 types similar to existing systems that encode in multiple formats to accommodate the different devices (iPad, vs phones vs TV etc. . . . ).

Returning to FIG. 4, the method may determine if the FOV for a particular virtual reality data device changes (404) using the data about the current viewing angle of the virtual reality device. If the FOV has not changed (still viewing the center FOV), then no FOV switch is performed (406). If the FOV has changed, then the method performs fast switching to the new FOV (408). These processes of the method (404-408) may be repeated each frame of each piece of virtual reality data for each virtual reality device so that the method is capable of fast FOV switching frame by frame of the virtual reality data.

Figure 7:
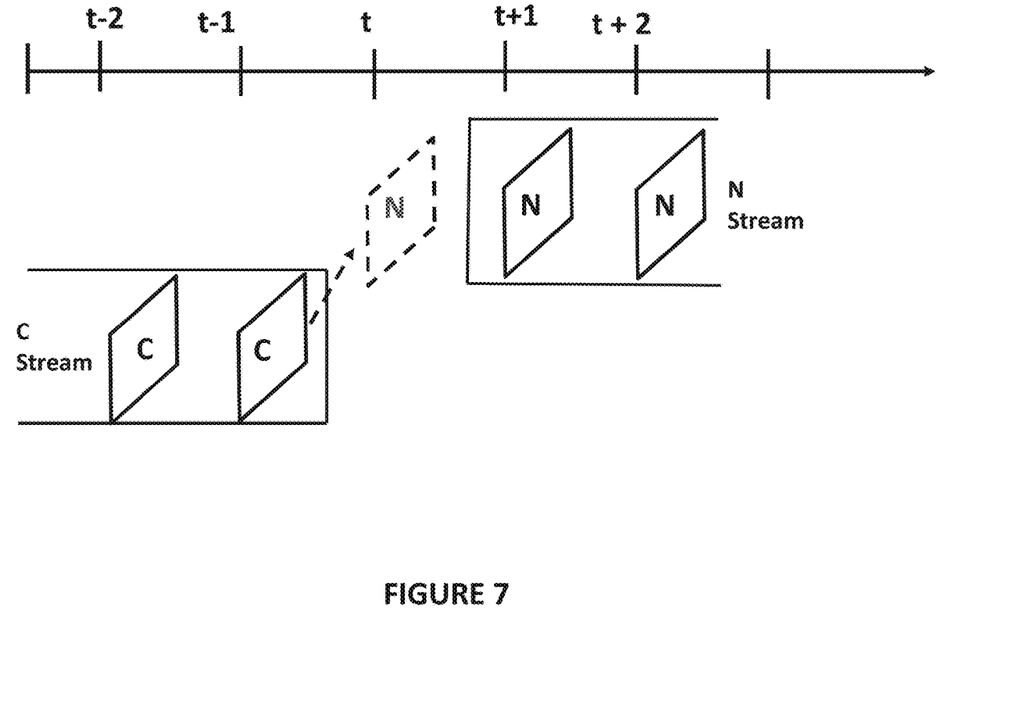
FIG. 7 illustrates an example of fast FOV switching process.

FIG. 7 illustrates an example of fast FOV switching. A FOV switch at frame t between a center FOV (C) and its neighbor from the top FOV (N) may be performed by switching between three streams. Specifically, as shown in FIG. 7, the original C stream is used until (t−1) when the FOV of the virtual reality device for the virtual reality data changes. At time t when the FOV changes, the frame at (t) that belongs to the zig-zag stream that goes from C to N is used to switch the FOV. Then, the new stream centered around the N starting at (t+1) is used thus performing fast switching of the FOVs.

For each user, the system and method may generate a unique stream being streamed from the backend 106 to the player in each virtual reality device 104. The backend 106 may perform the switching between FOVs by reading from different files if the content is pre-encoded in one implementation. So in this example, the backend 106 streams C to the player, then opens the zig-zag stream, extracts the N frame from the zig-zag at time t, then opens the N stream and keep streaming from N (T+1) and forward until a new switch is needed.

In one implementations, the streams in question are stored in chunks of X seconds (the interval between t and t+X for example. During pre-processing of the content, while generating the different FOVs, the pre-processor is in charge of indexing all chunks with location and size of each frame inside a chunk. This way, to perform a switch of a stream at frame (t), the metadata needed to locate the end of frame (t−1) in stream C, the frame (t) in the zig-zag stream, as well as the location of frame (t+1) inside the stream N is already available, allowing the streamer (streaming engine 304 in one implementation) to perform the switch with very minimal complexity.

Figure 8:
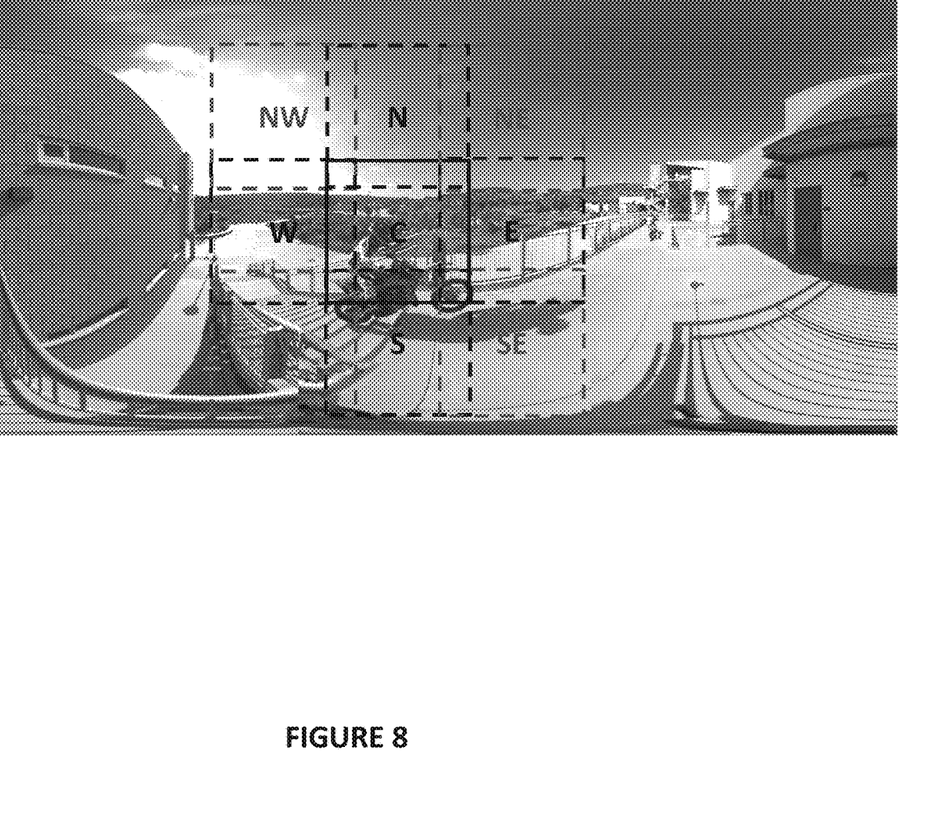
FIG. 8 illustrates overlapping FOVs.

The system and method for fast FOV switching may include a mechanism (that may be part of the streaming engine 304 in FIG. 3 in one implementation) that prevents frequent FOV switching when a user makes slight movements of the virtual reality device that would ordinarily cause the streamer to switch to a different FOV as described above. FIG. 8 illustrates an example of overlapping FOVs for an exemplary frame of virtual reality data so that neighbor FOVs will overlap to make sure there is a zone shared by adjacent FOVs where the video quality will be optimal regardless of the FOV to which the virtual reality device is switched. For example, the C FOV (the solid rectangular) shares some of the virtual reality data with each of the eight neighbor FOVs. As another example, a FOV at the edge of the neighbors, such as the SW FOV, shares virtual reality data content with its neighbors that include the C FOV, the W FOV and the S FOV. Thus, each neighbor FOV has several overlap zones with other FOVs. In the system, to prevent frequent switching for users oscillating positions between adjacent FOVs, a hysteresis algorithm may be implemented within the streamer 304 to lower the frequency of switching over time. For example, a user will have to have changed his view and thus the FOV be outside of the overlap zone for X ms before a switch is triggered. The value of X depends on the frame duration of the particular virtual reality data asset. For example, for 60 frames per second, a minimum frame interval may be 16 ms. For people and their visual acuity, 100 ms is really the max that can be sustained and 100 ms is 6 frames. Therefore, X can be expressed in frame duration with the range between 1 and 6 frame duration.

This algorithm allows for better control of the behavior of the algorithm as the zig-zag streams by nature are harder to encode than the standard linear streams, which result in a slight video quality compromise if the method were to keep on streaming from a zig-zag stream (that occurs when the FOV is switched). By limiting the frequency of switching, the system and method allows the streamer 304 to stream from a linear stream (aka not zig-zag) most of the time (the C stream, the N stream, the W stream, etc.), use of zig-zag streams (to perform the FOV switching) only for necessary switches when the user is changing view points with big enough movements. The "big enough" movement may be determined based on how big the FOV. For example, if a particular virtual reality data asset had a total of 6 effective FOVs covering the equator, then there is 60 degrees per FOV. If the method has an overlap of 20%, each FOV may be bigger (about 72 degrees) and any movement bigger than 12 degrees will go beyond the overlapping section. Thus, in general, a 10 degree movement may be a "big enough" movement.

In one embodiment, the system and method may reduce the complexity of the streamer 304 that is resident in the virtual reality data backend. In particular, to prevent the user from having to determine which chunk of virtual reality data to load next, which frame to extract next etc. . . . , the complexity of the switching logic may be shared with the player at initialization time when the player in the virtual reality device connects to the backend 106 and requests a specific virtual reality data asset to have streamed. The backend 106 will have already generated the chunks for each particular piece of virtual reality data, generated the FOV neighbors for each of the chunks of the particular piece of virtual reality data. Then, during the initialization for a player in a particular virtual reality device, the backend system 106 may communicate a manifest file to the player that maps the current asset (particular virtual reality data asset) to be viewed. The manifest file may specify the different chunks of the asset and the different neighbor FOVs per view point in the asset. Using the downloaded manifest file, the player may determine the sequence of chunks to receive from the streamer. In addition, when a head movement is detected at the player side, thanks to the prediction available on the headset, the player will be able to communicate in advance the next FOV to stream from and at which frame time a switch needs to be happening from which zig-zag chunk. This way, the streamer does not need to retrieve chunks based on the player location. Instead, the streamer only needs to handle the switch from the 3 chunks (files), as described above.

The fast field of view switching system and method may also be used for non-static view points. VR content is currently being shot from a static position, such that, when streaming the video, the end-user is at a static position, and the only freedom of liberty offered to the consumer is changing the FOV around the static location. In the near future, more content will be generated in such a way that it also offers location changes to users, as it is currently done in video games when going through a synthetic world. For example, with 2 static 360 degree cameras shooting a scenery, and distant by 500 m, the VR experience allows the user to move between views through some user interactivity. The fast field of view switching system and method using the nine neighbors switching can also be applied in this context. Instead of switching to a different FOV mapping to the same static position, a switching could be made to the new location mapping to the second camera position by having the player requesting a switch to a FOV mapping the other camera. This technique can be extended to an increased number of camera view points, which will allow the switching mechanism to deal with smoother movements between view points. Obviously, the implementation of the fast field of view switching system and method for non-static viewpoints requires additional FOVs (for each camera) and more streams to accommodate the switching between the cameras.

In an alternative embodiment, the system and method may establish a balance between the amount of zig-zig streams, switch points and encoding quality using a number of reference frames. In particular, the amount of zig-zag streams can be reduced by half if the switching architecture is setup to switch between neighbors every 2 frames instead of every frame. Looking back at FIG. 6, with only generating the C-S-C stream, every other frame is covered be the zig-zag stream. So by reducing the amount of total zig-zag streams to one, the method still allows switching, but with frequency of every other frame instead of every frame.

Figure 9:
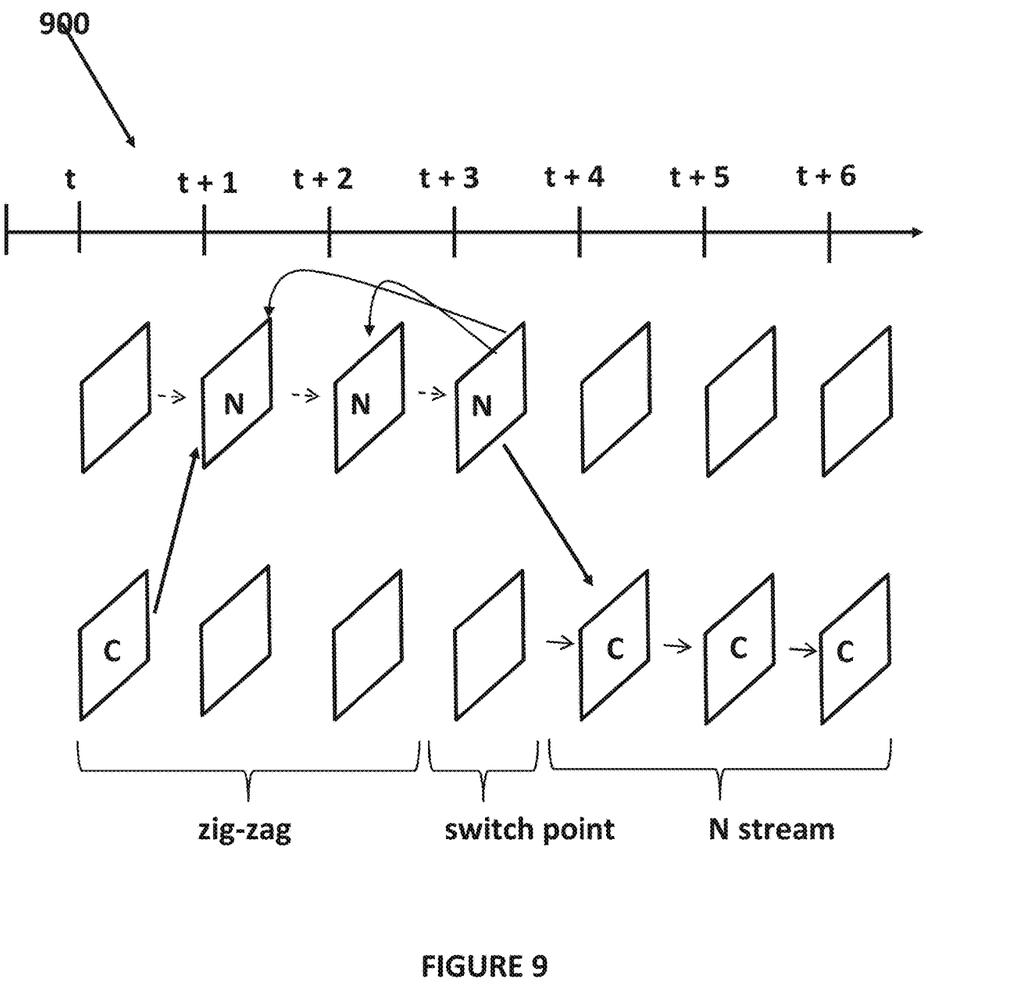
FIGS. 9 and 10 illustrate a method for encoding that balances switching.

In addition, the zig-zag stream can be built in a way that does not implement zig-zag on every frame as shown in the example in FIG. 6. Doing this has the advantage of allowing encoding with more than one reference frame, thus improving the overall encoding quality. As shown in FIG. 9, where the zig-zag stream is tracking a FOV for 4 frames before switching to the adjacent FOV, the method is now allow encoding with GOPs built with I and P frames, with P frames that can use 3 reference frames. Thus, in the example in FIG. 9, the zig-zag stream is CCCC NNNN CCCC NNNN . . . . For a zig-zag stream of type shown in FIG. 9, the switch point may be 3 frames after the switch. The balance to tune for is encoding quality vs. the frequency of switching allowed between adjacent FOVs.

Figure 10:
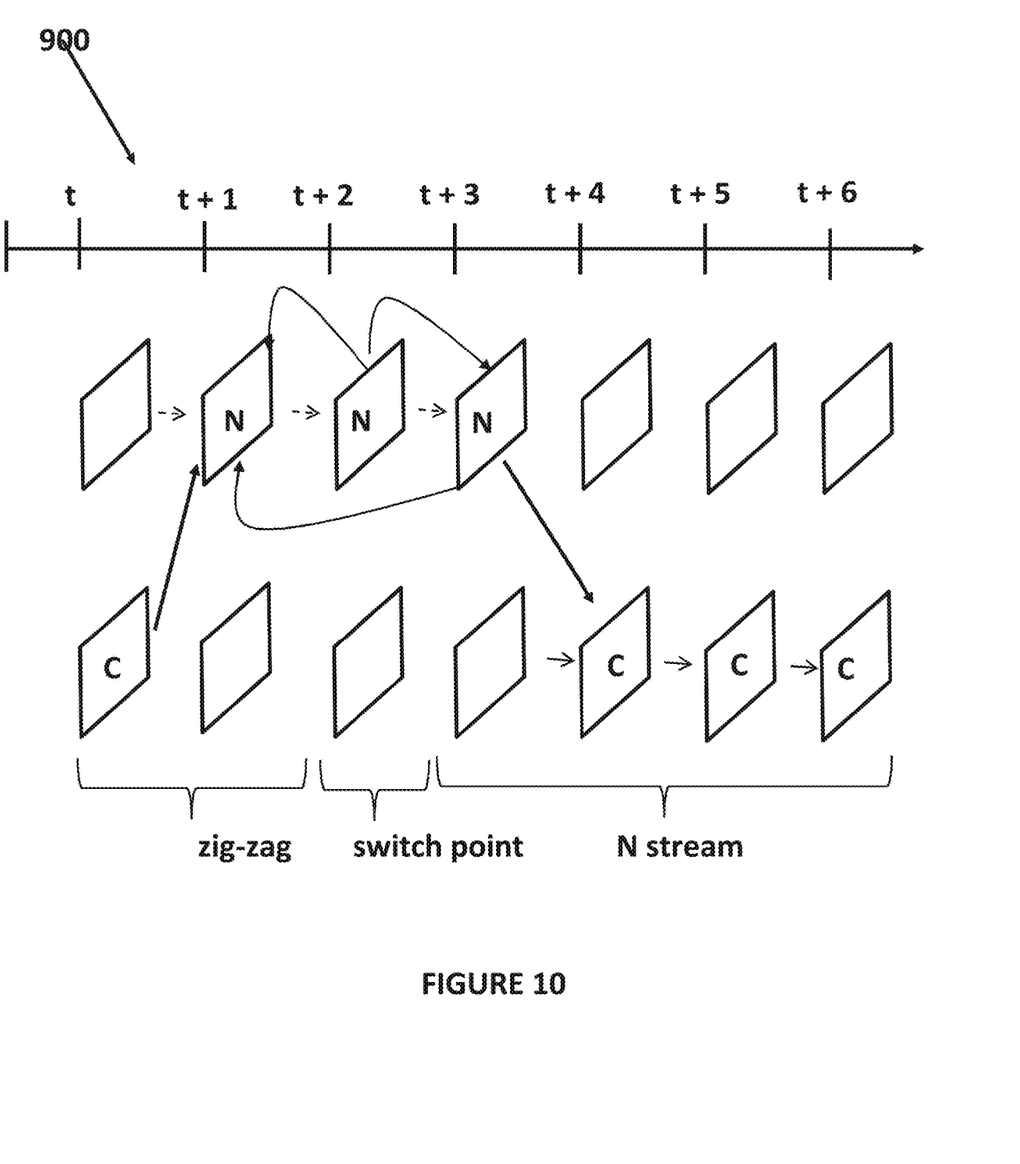

More generally, the concept can also be generalized to any kind of picture type (B or reference B Frames) in which zig-zag streams have to be built in order to account for backward and forward references. In such streams, the switch point will be at a location where enough frames of the same stream are available forward and backward from the switch point, in order to make sure that all frames referred by the current switch point will be available when switching away from the zig-zag stream, back into the linear FOV stream. An example is shown in the FIG. 10.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, micro-controllers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A field of view switching method for virtual reality data, comprising:
   providing virtual reality asset data, the virtual reality asset data including a plurality of fields of view for each frame of the virtual reality asset having a center field of view and a plurality of neighbor field of views adjacent to the center field of view for each data chunk of a virtual reality data asset, a stream for each field of view and a zig-zag stream for each field of view;
   determining that a viewpoint of a virtual reality device has changed; and
   switching the field of view of the virtual reality device on a frame by frame basis from a current field of view representing the viewpoint to one of the plurality of neighbor field of views based on change in the viewpoint of the virtual reality device.

2. The method of claim 1, wherein switching the field of view further comprises following a stream for the current field of view, using the zig-zag stream to switch between the current field of view and one of the plurality of neighbor field of views and following a stream for the switched to neighbor field of view.

3. The method of claim 1, wherein determining that a viewpoint has changed further comprises receiving movement data from the virtual reality device and determining that the viewpoint has changed for the virtual reality data using the received movement data.

4. The method of claim 3, wherein receiving the movement data further comprises receiving data from a sensor associated with the virtual reality device that indicates a movement of the virtual reality device.

5. The method of claim 1, wherein each field of view has an overlap zone that comprises pixels that are shared with the plurality of neighbor field of views that reduces a switching between the field of views.

6. The method of claim 5, wherein switching the field of view further comprises switching the field of view of the virtual reality device from a current field of view representing the viewpoint to one of the plurality of neighbor field of views when the virtual reality device viewpoint is outside of the overlap zone of the current field of view for a predetermined time.

7. The method of claim 1 further comprising generating, for each virtual reality data asset, the plurality of fields of view, the stream for each field of view and the zig-zag stream for each field of view and each one of the plurality of neighbor field of views and storing the plurality of fields of view, the stream for each field of view and the zig-zag stream for each field of view and each one of the plurality of neighbor field of views.

8. The method of claim 1 further comprising downloading a manifest file from a backend to a player application of the virtual reality device, the manifest file mapping the plurality of different chunks of data that can be sent from the backend for the virtual reality asset and the plurality of fields of views for each viewpoint in the virtual reality asset.

9. The method of claim 8 further comprising requesting, by the player application, the chunks of virtual reality asset data from a backend based on the manifest file.

10. The method of claim 8, wherein switching the field of view further comprises requesting, by the player application, the stream for a viewpoint change from a backend based on the manifest file.

11. The method of claim 1, wherein switching the field of views further comprises switching the field of views between a viewpoint of different cameras.

12. The method of claim 1, wherein the virtual reality data asset further comprises one of a video and a graphics commands mapping the field of views.

13. The method of claim 1, wherein the switching the field of views occurs each frame.

14. The method of claim 1, wherein the switching the field of views occurs every two frames.

15. An apparatus for field of view switching for virtual reality data, comprising:
a hardware storage device that stores virtual reality asset data, the virtual reality asset data including a plurality of fields of view for each frame of the virtual reality asset having a center field of view and a plurality of neighbor field of views adjacent to the center field of view for each data chunk of a virtual reality data asset, a stream for each field of view and a zig-zag stream for each field of view;
a virtual reality data backend computer system having a processor and plurality of instructions that configured the processor to:
receive a determination that a viewpoint of a virtual reality headset has changed; and
switch the field of view of the virtual reality headset on a frame by frame basis from a current field of view representing the viewpoint to one of the plurality neighbor field of views based on change in the viewpoint of the virtual reality headset.

16. The apparatus of claim 15, wherein the processor is further configured to follow a stream for the current field of view, use the zig-zag stream to switch between the current field of view and one of the plurality of neighbor field of views and follow a stream for the switched to neighbor field of view.

17. The apparatus of claim 15, wherein the virtual reality headset that communicates with the virtual reality data backend computer system and has a sensor that detects the change of viewpoint of the virtual reality headset.

18. The apparatus of claim 15, wherein each field of view has an overlap zone that comprises pixels that are shared with each of the plurality neighbor field of views that reduces a switching between the field of views.

19. The apparatus of claim 18, wherein the processor is further configured to switch the field of view of the virtual reality headset from a current field of view representing the viewpoint to one of the plurality of neighbor field of views when the virtual reality headset viewpoint is outside of the overlap zone of the current field of view for a predetermined time.

20. The apparatus of claim 18, wherein the processor is further configured to generate, for each virtual reality data asset, the plurality of fields of views, the stream for each field of view and the zig-zag stream for each field of view and storing the plurality of fields of view, the stream for each field of view and the zig-zag stream for each field of view.

21. The apparatus of claim 17, wherein the processor is further configured to download a manifest file to the virtual reality headset, the manifest file mapping a plurality of different chunks of data that can be sent from the backend for the virtual reality asset and the plurality of fields of views for each viewpoint in the virtual reality asset.

22. The apparatus of claim 21, wherein the virtual reality headset has a processor that is configured to request the chunks of virtual reality asset data from the virtual reality data backend computer system based on the manifest file.

23. The apparatus of claim 22, wherein the processor of the virtual reality headset is further configured to request the stream for a viewpoint change from the virtual reality data backend computer system based on the manifest file.

24. The apparatus of claim 15, wherein the processor of the virtual reality headset is further configured to switch the field of views between a viewpoint of different cameras.

25. The apparatus of claim 15, wherein the virtual reality data asset further comprises one of a video and a graphics commands mapping the field of views.

26. The apparatus of claim 15, wherein the processor of the virtual reality headset is further configured to switch the field of views each frame.

27. The apparatus of claim 15, wherein the processor of the virtual reality headset is further configured to switch the field of views every two frames.

* * * * *